(12) United States Patent
Inoguchi

(10) Patent No.: US 7,391,575 B2
(45) Date of Patent: Jun. 24, 2008

(54) IMAGE DISPLAY APPARATUS

(75) Inventor: Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 11/538,233

(22) Filed: Oct. 3, 2006

(65) Prior Publication Data

US 2007/0091447 A1    Apr. 26, 2007

(30) Foreign Application Priority Data

Oct. 3, 2005    (JP) .............................. 2005-289873

(51) Int. Cl.
*G02B 27/14* (2006.01)
(52) U.S. Cl. .......................... 359/631; 359/630; 345/7; 349/11
(58) Field of Classification Search ................ 359/630, 359/631; 345/7; 349/11
See application file for complete search history.

(56) References Cited

U.S. PATENT DOCUMENTS 6,130,784 A * 10/2000 Takahashi .................... 359/630

FOREIGN PATENT DOCUMENTS

| EP | 1 312 968 A1 | 5/2003 |
|----|--------------|--------|
| JP | 2003-149593 | 5/2003 |
| JP | 2004-341324 | 12/2004 |

* cited by examiner

*Primary Examiner*—Joseph Martinez
(74) *Attorney, Agent, or Firm*—Morgan & Finnegan LLP

(57) ABSTRACT

An image display apparatus is disclosed, which is small and has a wide view angle. The apparatus comprises an optical system which introduces light beams from first and second image display elements to first and second observation regions. The system has a plane-symmetric structure whose plane of symmetry is a plane passing between the first and second observation regions. The system introduces the light beam from the first image display element located in a first area with respect to the plane of symmetry to the first observation region via a reflection on a surface located in a second area after a reflection on a surface located in the first area, and introduces the light beam from the second image display element to the second observation region via a reflection on a surface located in the first area after a reflection on a surface located in the second area.

11 Claims, 7 Drawing Sheets

IMAGE DISPLAY APPARATUS

BACKGROUND OF THE INVENTION

The present invention relates to image display apparatuses which provide an image displayed on an image display element such as an liquid crystal display element (liquid crystal panel) to an observer through an optical system. The image display apparatuses are especially suitable for head mounted displays (HMDs).

The HMD needs to increase realistic sensation by widening the view angle while reducing its size. In addition, considering the weight balance of the HMD, reduction of the thickness of the HMD is desired.

Increasing the size of the liquid crystal panel is preferable for responding the requirement for a wider view angle. However, enlarging the panel increases the cost of the HMD. To achieve a wider view angle by using a small panel, intermediate image-forming optical system which forms an intermediate real image of an original image displayed on the panel and provides an enlarged virtual image of the intermediate image to an observer is preferable to an optical system without forming an intermediate real image. However, the once-image-forming optical system includes a lot of components and its optical path length is long, so that the HMD generally is heavy and large.

An HMD designed to have a wide view angle and a small size has been disclosed in Japanese Patent Laid-Open No. 2003-149593 (corresponding to EP1312968A1). In this HMD, a shuttle optical path is formed by using a returning reflecting surface and decentered reflecting surfaces located anterior and posterior to the returning reflecting surface to form a long optical path which is needed for once image formation in a small optical system.

In addition, the HMD needs to provide a good appearance of an observer wearing it on his/her head. Especially when the observer wearing an HMD is seen from the front, an HMD having a thin and horizontally long shape provides a better impression if the HMD has the same projected area as that of other ones.

For example, when an observer shown in FIG. 7A wears an HMD on his head, the observer wearing an HMD having a vertically short and horizontally long shape as shown in FIG. 7C looks better than the observer wearing an HMD having a vertically long and horizontally short shape as shown in FIG. 7B. To construct such a horizontally long HMD, using a horizontally-folded optical system in which plural decentered reflective surfaces (the decentering directions thereof) are arranged in the horizontal direction of the face has an advantage over using an optical system in which the reflecting surfaces are arranged in the vertical direction of the face.

Japanese Patent Laid-Open No. 2004-341324 has disclosed a horizontally-folded optical system which uses the shuttle optical path formed with the returning reflecting surface disclosed in Japanese Patent Laid-Open No. 2003-149593. Japanese Patent Laid-Open No. 2004-341324 has disclosed in its embodiment an optical system in which a reflecting surface is located between an optical element that forms the shuttle optical path and an image display element and in which optical paths for right and left eyes intersect with each other between the image display element and the reflecting surface and between the reflecting surface and the optical element.

The optical system disclosed in Japanese Patent Laid-Open No. 2004-341324 makes it possible to construct a horizontally long HMD. However, its thickness to the front of the observer is not sufficiently reduced.

BRIEF SUMMARY OF THE INVENTION

An object of the present invention is to provide an image display apparatus which is smaller in size (thinner) than conventional ones and has a wide view angle.

According to an aspect, the present invention provides an image display apparatus that comprises first and second image display elements each of which displays an original image, and an optical system which introduces light beams from the first and second image display elements to first and second observation regions, respectively. The optical system has a plane-symmetric structure whose plane of symmetry is a plane passing between the first and second observation regions, the first image display element and the first observation region being located in a first area on one side with respect to the plane of symmetry and the second image display element and the second observation region being located in a second area on the other side with respect to the plane of symmetry. The optical system introduces the light beam from the first image display element to the first observation region via a reflection on a reflecting surface located in the second area after a reflection on a reflecting surface located in the first area. Further, the optical system introduces the light beam from the second image display element to the second observation region via a reflection on a reflecting surface located in the first area after a reflection on a reflecting surface located in the second area.

According to another aspect, the present invention provides an image display system that comprises the above image display apparatus and an image information supply apparatus.

Other objects and features of the present invention will become readily apparent from the following description of the preferred embodiments with reference to accompanying drawings.

DETAILED DESCRIPTION OF THE PREFERRED EMBODIMENTS

Hereinafter, preferred embodiments of the present invention will be described with reference to the accompanying drawings.

Embodiment 1

Figure 1:
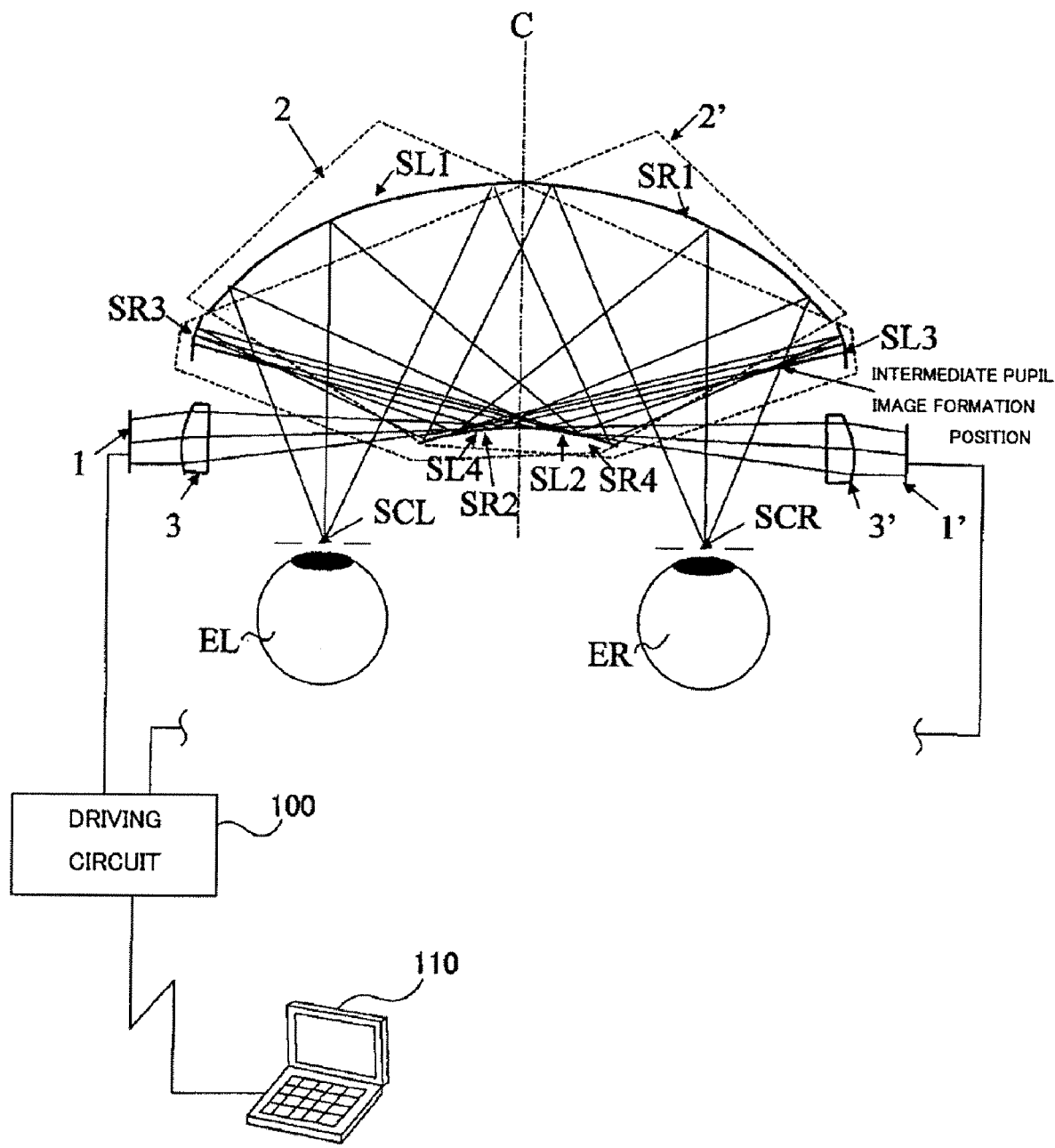
FIG. 1 is a top cross sectional view showing the configuration of the HMD that is Embodiment 1 of the present invention.

FIG. 1 shows the configuration of the HMD as an image display apparatus that is Embodiment 1 of the present invention. FIG. 1 is a top view of the HMD.

In FIG. 1, 1 denotes a liquid crystal display element (hereinafter referred to as an LCD) that is an image display element for a left eye EL of an observer. 2 denotes decentered reflecting curved surfaces for the left eye EL, which are constituted by four mirrors SL1, SL2, SL3 and SL4. 3 denotes a lens which condenses a light beam from the LCD 1. These decentered reflecting curved surfaces 2 and lens 3 constitute a left-eye optical system.

1' denotes an LCD that is an image display element for a right eye ER. 2' denotes decentered reflecting curved surfaces for the left eye ER of the observer, which are constituted by four mirrors SR1, SR2, SR3 and SR4. 3' denotes a lens which condenses a light beam from the LCD 1'. These decentered reflecting curved surfaces 2' and lens 3' constitute a right-eye optical system.

SCL and SCR denote the centers of exit pupils (hereinafter each referred to as the exit pupil center) which are formed by the left-eye and right-eye optical systems, respectively.

C denotes a plane which passes through the center of a line segment that connects the exit pupil center SCL of the left-eye optical system with the exit pupil center SCR of the right-eye optical system, the plane being orthogonal to the line segment. The left-eye and right-eye optical systems as well as the image display surfaces of the LCDs 1 and 1' are arranged plane-symmetrically with respect to the plane C that is the plane of symmetry.

In addition, in this embodiment, the mirror (reflecting surface) SL2 of the left-eye optical system and the mirror (reflecting surface) SR4 of the right-eye optical system are formed on one surface, and the mirror (reflecting surface) SL4 of the left-eye optical system and the mirror (reflecting surface) SR2 of the right-eye optical system are formed on one surface.

The HMD of this embodiment includes a driving circuit 100 which drives the LCDs 1 and 1'. An image information supply apparatus 110, such as a personal computer, a DVD player and a television tuner, is connected to the driving circuit 100. The driving circuit 100 causes the LCDs 1 and 1' to display an original image according to image information input from the image information supply apparatus 110. The HMD and the image information supply apparatus 110 constitute an image display system. This is the same for another embodiment described later.

The optical path in the left-eye optical system will be described first. The light beam from the LCD 1 located on the left-eye side with respect to the plane C (in other words, located in a left-eye-side area that is a first area) is condensed by the lens 3 and then enters a space surrounded by the four mirrors SL1 to SL4. The light beam that entered the space is reflected by the mirror (first reflecting surface) SL4 located on the left-eye side with respect to the plane C to proceed toward the mirror (second reflecting mirror) SL3 located on the right-eye side with respect to the plane C (in other words, located in a right-eye-side area that is a second area).

The light beam reflected by the mirror SL3 is reflected by the mirror (fourth reflecting surface) SL2 located on the right-eye side with respect to the plane C to proceed toward the mirror (third reflecting mirror) SL1 located on the left-eye side with respect to the plane C.

The light beam reflected by the mirror SL1 forms the exit pupil and is introduced to the left eye EL of the observer, the left eye EL being placed in a left observation region which includes the position of the exit pupil and the vicinity thereof. An enlarged image of the original image displayed on the LCD 1 thereby is provided to the left eye EL of the observer.

On the other hand, the light beam from the LCD 1' located on the right-eye side with respect to the plane C is condensed by the lens 3' and then enters a space surrounded by the four mirrors SR1 to SR4.

The light beam that entered the space is reflected by the mirror (first reflecting surface) SR4 located on the right-eye side with respect to the plane C to proceed toward the mirror (second reflecting mirror) SR3 located on the left-eye side with respect to the plane C. The light beam reflected by the mirror SR3 is reflected by the mirror (fourth reflecting surface) SR2 located on the left-eye side with respect to the plane C to proceed toward the mirror (third reflecting mirror) SR1 located on the right-eye side with respect to the plane C.

The light beam reflected by the mirror SR1 forms the exit pupil and is introduced to the right eye ER of the observer, the right eye EL being placed in a right observation region which includes the position of the exit pupil and the vicinity thereof. An enlarged image of the original image displayed on the LCD 1' thereby is provided to the right eye ER of the observer.

As described above, the left-eye and right-eye optical systems have a plane-symmetrical shape with respect to the plane C, so that an optical path for the left eye and an optical path for the right eye are plane-symmetrical with respect to the plane C. Therefore, only the left-eye optical system will hereinafter be described in detail.

Figure 2:
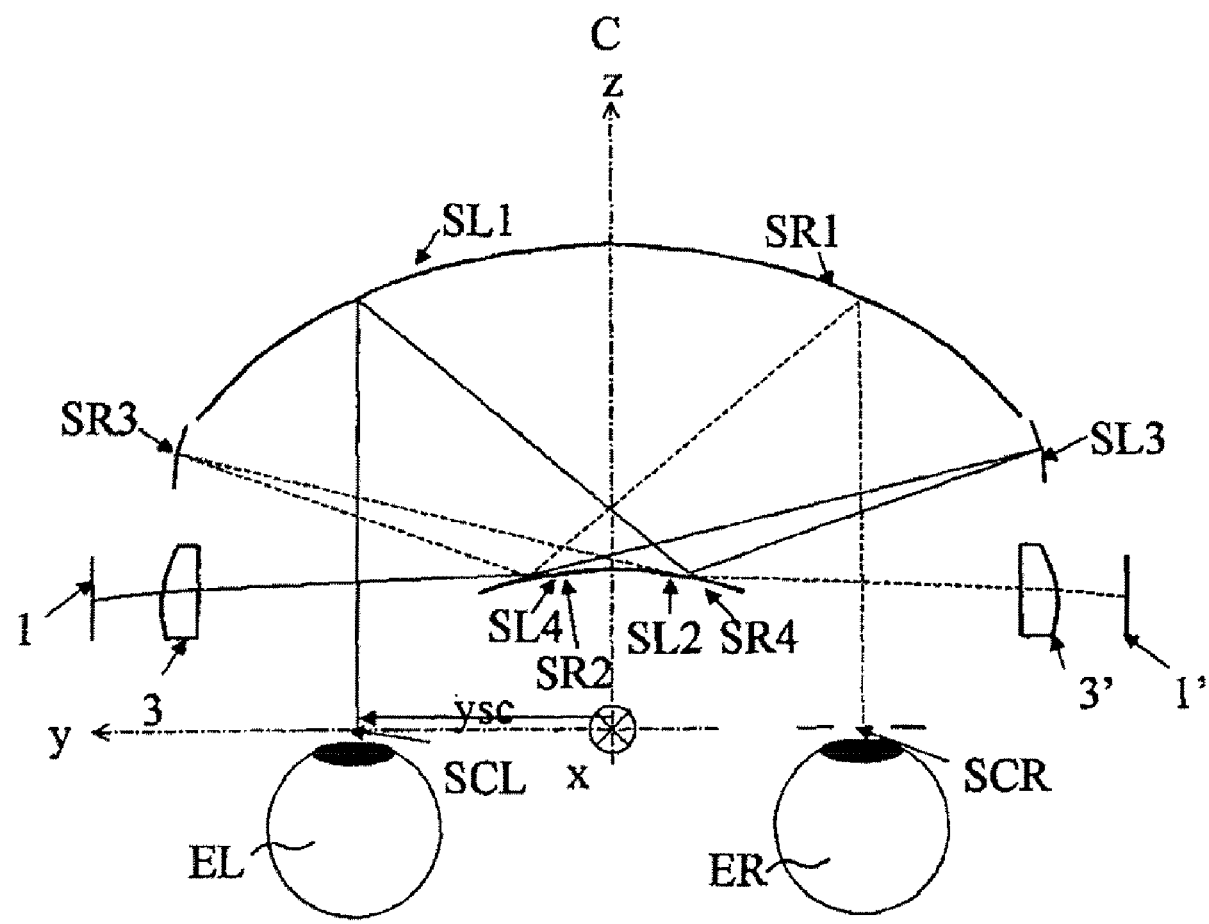
FIG. 2 is a top cross sectional view showing the optical path of the central view angle principal ray in Embodiment 1.

FIG. 2 shows a central view angle principal ray which exits from the center of the display surface of the LCD 1 and then reaches the exit pupil center SCL. In FIG. 2, a straight line formed by intersection of the paper of the figure and the plane C is defined as the z-axis. On the z-axis the direction substantially opposite to a direction in which the central view angle principal ray enters the left eye EL is defined as the positive direction.

In addition, a straight line passing through the left and right exit pupil centers SCL and SCR is defined as the y-axis. On the y-axis the direction toward the left exit pupil from the right exit pupil is defined as the positive direction. Further, a straight line orthogonal to the y- and z-axes is defined as the x-axis. On the x-axis a direction toward the back of the paper of the figure is defined as the positive direction such that a right-hand system is formed. The intersection of the y-axis with the plane C is defined as the origin (0, 0, 0).

The optical path in the z-axis direction will be described first. In the following description, the mirror is referred to as the 'surface (or reflecting surface or optical surface)'.

The light beam that exited from the LCD 1 is reflected by the surface SL4 to proceed in the z-positive direction, introduced to the surface SL3 and then reflected by the surface SL3 to proceed in the z-negative direction. Further, the light beam is reflected by the surface SL2 to proceed in the z-positive direction, reflected by the surface SL1 to proceed in the z-negative direction and then reaches the left eye EL. Folding the optical path in a zig-zag manner like this makes it possible to reduce the thickness of the optical system in the z-axis direction.

Next, the optical path in the y-axis direction will be described. The light beam that exited from the LCD 1 located on the left-eye side with respect to the plane C, that is, on the y-positive side is reflected by the surface SL4 to proceed toward the surface SL3 located on the right-eye side, that is, on the y-negative side and then returned to the y-positive side by a reflection on the surface SL2 located on the y-negative side. The light beam then is reflected by the surface SL1 located on the y-positive side to reach the left-eye EL placed on the y-positive side.

In this embodiment, the LCD 1 is located at a position further on the y-positive side than the exit pupil center (0, ysc, 0) of the left-eye optical system. That is, the distance from the plane C to the LCD 1 is longer than that from the plane C to the exit pupil center SCL. Moreover, the surface SL3, which has a role to cause the light beam proceeding in the y-negative direction to return such that the light beam proceeds in the y-positive direction, is located at a position further on the y-negative side than the exit pupil center (0, −ysc, 0) of the right-eye optical system. These make it possible to ensure an extremely longer optical path length than that in conventional optical systems.

In addition, these make it possible to reduce optical powers of the optical surfaces required for providing an enlarged virtual image of the original image displayed on the LCD 1 to the left eye EL, thereby facilitating an improvement of the optical performance of the optical system.

Especially in the configuration in which the optical path is laid out in the direction connecting the left and right eyes like this embodiment, it is difficult to make an optical path length longer than the inter pupillary distance 2×ysc. However, this embodiment ensures an optical path length longer than the inter pupillary distance 2×ysc in the optical system located in front of the observers' face as described above to facilitate an improvement of the optical performance.

Furthermore, in this embodiment, the surface SL3 which returns the light beam proceeding in the y-negative direction to the y-positive direction is located at a position which is on the y-negative side and folds the optical path in a zig-zag manner in the z-axis direction, thereby achieving a small-sized optical system that is thin in the view axis direction (that is, the z-axis direction) while it has a long optical path length. This makes it possible to ensure an extremely long optical path length even though the optical system is small in size.

Such a configuration of the optical system facilitates forming an intermediate real image of the original image displayed on the LCD 1 in the optical path of the optical system. Forming an intermediate real image makes it possible to arbitrarily determine the relationship between the optical power of each surface and the shape of the optical path, thereby increasing the freedom degree of arrangement of the optical surfaces. Accordingly, it is easy to widen the view angle for observation of the image with respect to the size of the original image, thereby making it possible to provide an impressive image with high realistic sensation to the observer.

Figure 3:
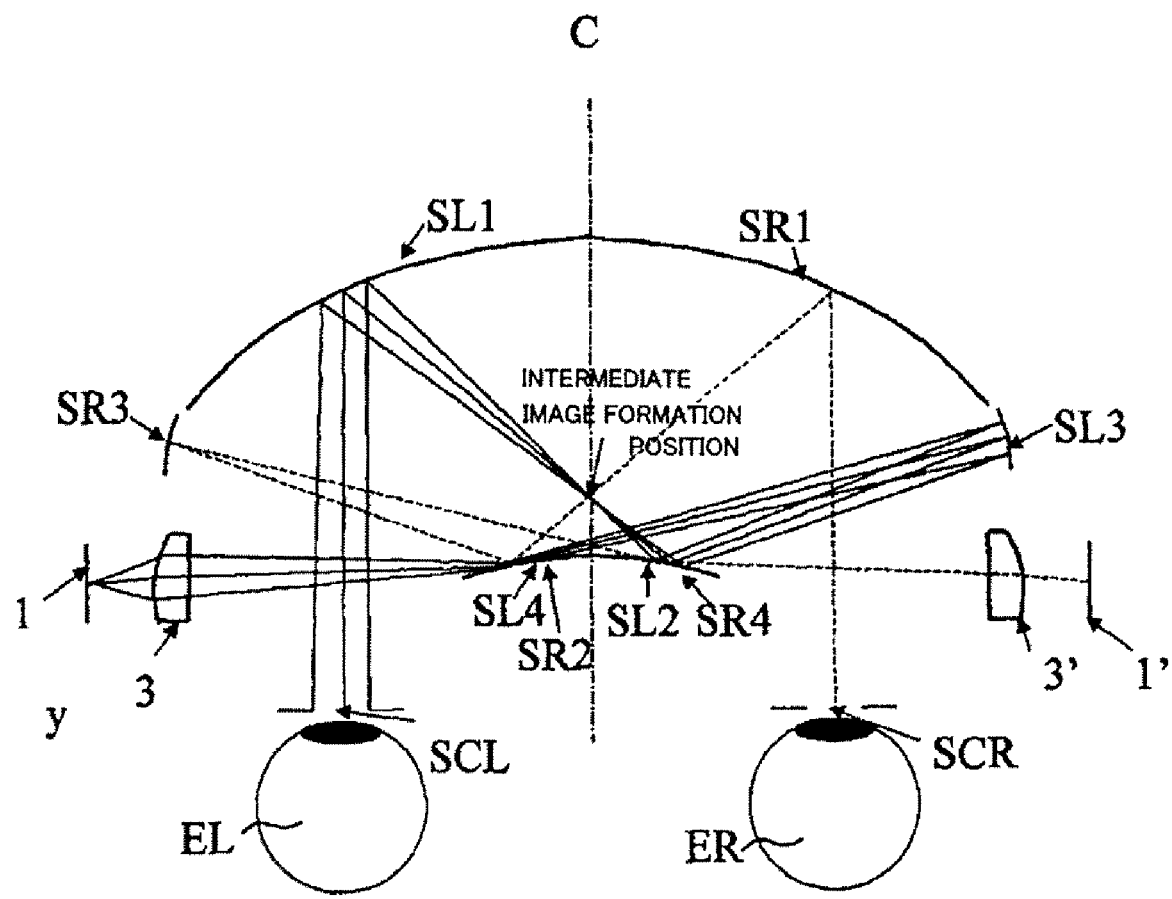
FIG. 3 is a top cross sectional view showing the intermediate image formation position in Embodiment 1.

Next, the intermediate image in this embodiment will be described with reference to FIG. 3. The intersection of rays that exit from the center of the display surface (that is, the original image) and then reach the both ends of the effective exit pupil on the cross section shown in FIG. 3 is defined as an intermediate image formation position. In this embodiment, it is preferable to form the intermediate image between the surface SL1 that is a decentered reflecting curved surface and the surface SL2. This is because it becomes easy to reduce the effective size of the surface SL2.

However, this does not mean that the intermediate image formation position is limited to the position between the surfaces SL1 and SL2 in the present invention. The intermediate image may be formed at a position between the surfaces SL2 and SL3. In other words, the intermediate image formation position may be located substantially between the surfaces SL1 and SL3.

In addition, an intermediate pupil image formation position is also important for making the size of the optical system as small as possible. A point where rays that exit from the ends of the display surface to reach the exit pupil center intersect with each other in the middle of the optical path on the cross section shown in FIG. 1 is defined as the intermediate pupil image formation position.

In FIG. 1, the intermediate pupil image formation position is located in the optical path from the surface SL3 that is a returning reflecting surface to the surface SL2. In particular, locating the intermediate pupil image formation position at a position closer to the surface SL3 than to the surface SL2 makes it possible to reduce the size of the effective aperture of the returning reflecting surface SL3, which is more preferable.

Although the intermediate pupil image formation position is not limited in the present invention, it is preferable that the intermediate pupil image formation position is located at a position anterior or posterior to the returning reflecting surface SL3 in view of reduction of the size of the optical system.

Next, the condition for the reflection on the surface SL3 will be described in detail. The surface SL3 performs a reflection such that the impinging ray and the reflected ray form an acute angle.

Satisfying this condition overlaps the optical path of the light beam proceeding to the surface SL3 and the optical path of the light beam reflected by the surface SL3 in the area that is surrounded by the plural reflecting surfaces to reduce the size of the optical system.

Focusing attention on the central view angle principal ray, it is preferable that the angle θ formed by the ray impinging on the surface SL3 and the ray reflected by the surface SL3 be smaller than 40 degrees.

In the area surrounded by the plural reflecting surfaces, the central view angle principal ray in the optical path extending to the position where an intermediate image is formed in the relay optical system intersects with the central view angle principal ray in the optical path extending from the intermediate image to the pupil in the eye-piece optical system.

Overlapping the optical paths anterior and posterior to the surface SL3 as described above makes it possible to reduce the size of the optical system. It is more preferable that the angle θ formed by the ray impinging on the surface SL3 and the ray reflected by the surface SL3 be smaller than 20 degrees. This increases the degree of overlap of the optical paths, which is more effective for reducing the size of the optical system.

In the optical system of this embodiment, since the decentering direction of each reflecting surface is only one direction with respect to the central view angle principal ray, it is preferable to form each reflecting surface such that it has a plane-symmetric shape with respect to a plane (paper plane of FIGS. 1 to 3) including the central view angle principal ray. This makes it possible to use common components for constituting the left-eye and right-eye optical systems.

Furthermore, it is preferable to form each reflecting surface such that it has a rotationally asymmetric shape, which is symmetric only with respect to the yz cross section shown in FIG. 2. This is because a rotationally asymmetric aberration caused by the decentered reflecting curved surfaces SL1 to SL4 can be corrected and a high quality image thereby can be provided.

In this embodiment, since the surface SL1 has a higher degree of decentering (that is, the surface SL1 tilts larger with respect to the central view angle principal ray) and a higher refracting power than the surface SL3, a large rotationally asymmetric aberration is generated by the surface SL1. Therefore, it is preferable to make the shape of the surface SL1 rotationally asymmetric to suppress generation of the rotationally asymmetric aberration.

Although increasing the number of the rotationally asymmetric surfaces facilitates an improvement of the optical performance, it is not necessarily necessary to make all surfaces rotationally asymmetric.

The component having the surfaces SL2 and SL4 may be separate components or may be formed as an integrated component. Also, the component having the surfaces SL1 and SR1 may be separate components or may be formed as an integrated component. Further, the surfaces SR3, SL1, SR1 and SL3 may be formed on a single component. Forming the plural reflecting surfaces on a single component can reduce the numbers of components and assembling processes.

In addition, in view of the symmetry of the left-eye and right-eye optical systems, it is natural that the surfaces SL2 and SL4 are formed on a single component. The effective part of each of the surfaces SL2 and SL4 may not have a rotationally symmetric shape and may have a rotationally symmetric aspheric shape with respect to the z-axis.

Moreover, each of the surfaces SL2 and SL4 may be a spherical surface. Using such a component having rotational symmetry reduces the cost of the optical system though the effect to correct the asymmetric aberration reduces.

Although the lens 3 is formed as a single lens in this embodiment, it may be formed by plural lenses, combination of a lens and a mirror, or the like. Forming the lens 3 by plural lenses reduces the optical power of each surface, which makes it possible to suppress an aberration generated by each surface and to improve the optical performance by, for example, obtaining an achromatic effect by the plural lenses including a concave lens.

Although the decentered reflecting surfaces include concave mirrors in this embodiment, it is preferable to employ a configuration which further includes at least one convex mirror. The configuration of this embodiment includes the concave mirrors SL1 and SL3 and the convex mirror SL2 and SL4 to reduce the Petzval sum generated by the decentered reflecting surfaces and negates it by the lens 3.

The above description with reference to FIGS. 2 and 3 is the same for the right-eye optical system.

Embodiment 2

Figure 4:
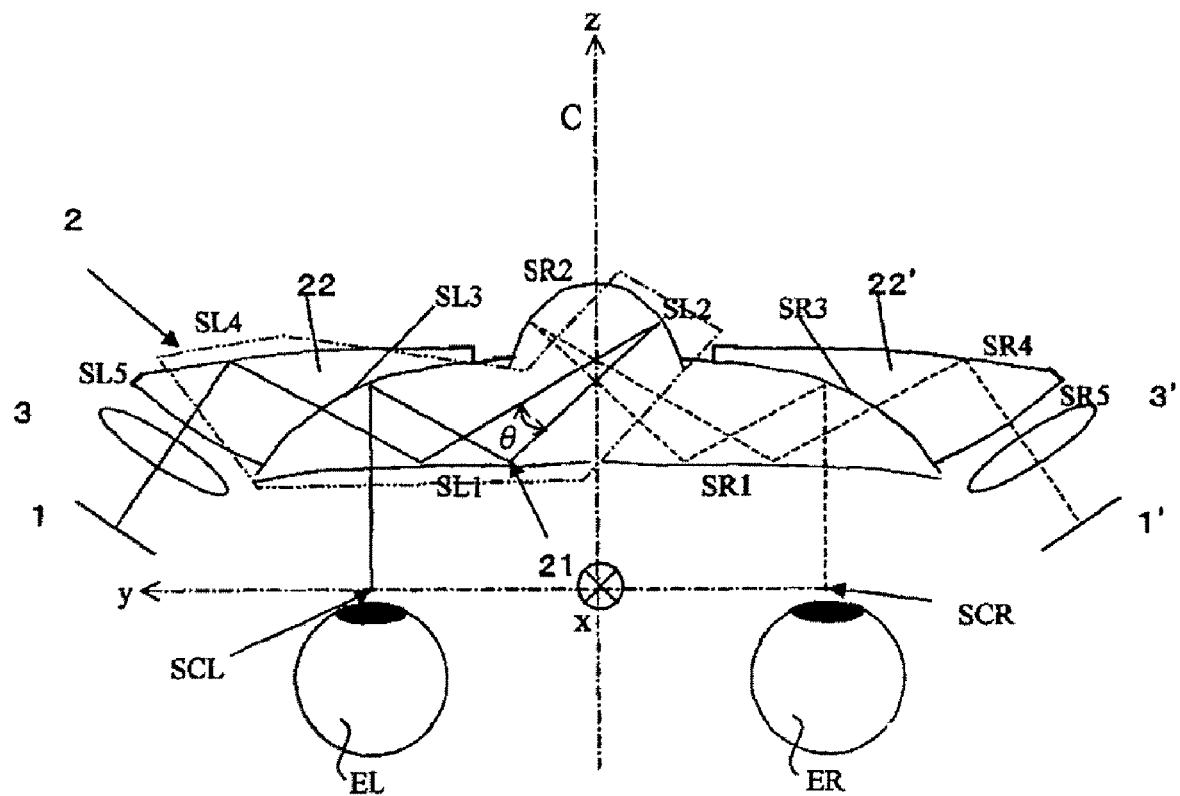
FIG. 4 is a top cross sectional view showing the configuration of the HMD that is Embodiment 2 of the present invention.

FIG. 4 shows the configuration of the HMD as an image display apparatus that is Embodiment 2 of the present invention. FIG. 4 is a top view of the HMD. In FIG. 4, the components in this embodiment which are similar to those in Embodiment 1 are designated with the same reference numerals as those in Embodiment 1, and the description thereof is omitted.

This embodiment differs from Embodiment 1 in that four surfaces SL1, SL2, SL3 and SL4 are formed on prisms 21 and 22 and four surfaces SR1, SR2, SR3 and SR4 are formed on prisms 21 and 22'. This embodiment also differs from Embodiment 1 in that the surfaces SL1 and SL3 and the surfaces SR1 and SR3 are surfaces for reflection and transmission.

Further, the prism 21 is shared by left-eye and right-eye optical systems, and the surfaces SL1, SR1, SL2, SR2, SL3 and SR3 are formed on the prism 21. The prisms 21 and 22 are cemented at the surface SL3, and the prisms 21 and 22' are cemented at the surface SR3.

Moreover, in this embodiment the left-eye and right-eye optical systems are symmetric with respect to a plane C, so that only the optical path and optical function of the left-eye optical system will hereinafter be described.

The light beam from an LCD 1 located on the left-eye side with respect to the plane C (in other words, located in a left-eye-side area that is a first area) is condensed by a lens 3 and introduced to the prism 22. The light beam that entered the prism 22 through a transmitting surface SL5 enters a region surrounded by the four decentered reflecting curved surfaces SL1 to SL4. The light beam that entered the region is reflected by the surface SL4 located on the left-eye side with respect to the plane C and then enters the prism 21 through the cemented surface SL3 that is a half-mirror surface.

The light beam that entered the prism 21 impinges on the surface (first reflecting surface) SL1 located on the left-eye side with respect to the plane C at an incident angle of $\sin^{-1}(1/n)$ or more when n represents the refractive index of the medium of the prism 21 and $\sin^{-1}(1/n)$ represents the critical angle. Thereby, the light beam is subjected to an internal total reflection on the surface SL1 and then proceeds toward the surface (second reflecting surface) SL2 located on the right-eye side with respect to the plane C (in other words, located in a right-eye-side area that is a second area).

The light beam reflected by the surface SL2 and retuned to the left-eye side with respect to the plane C is subjected to an internal total reflection on the surface SL1 again by impinging thereon at an incident angle of $\sin^{-1}(1/n)$ or more and then proceeds toward the surface (third reflecting surface) SL3. The light beam reflected by the half-mirror surface SL3 impinges on the surface SL1 at an incident angle smaller than $\sin^{-1}(1/n)$ to exit from the prism 21 and then is introduced to a left eye EL of an observer.

Figure 5:
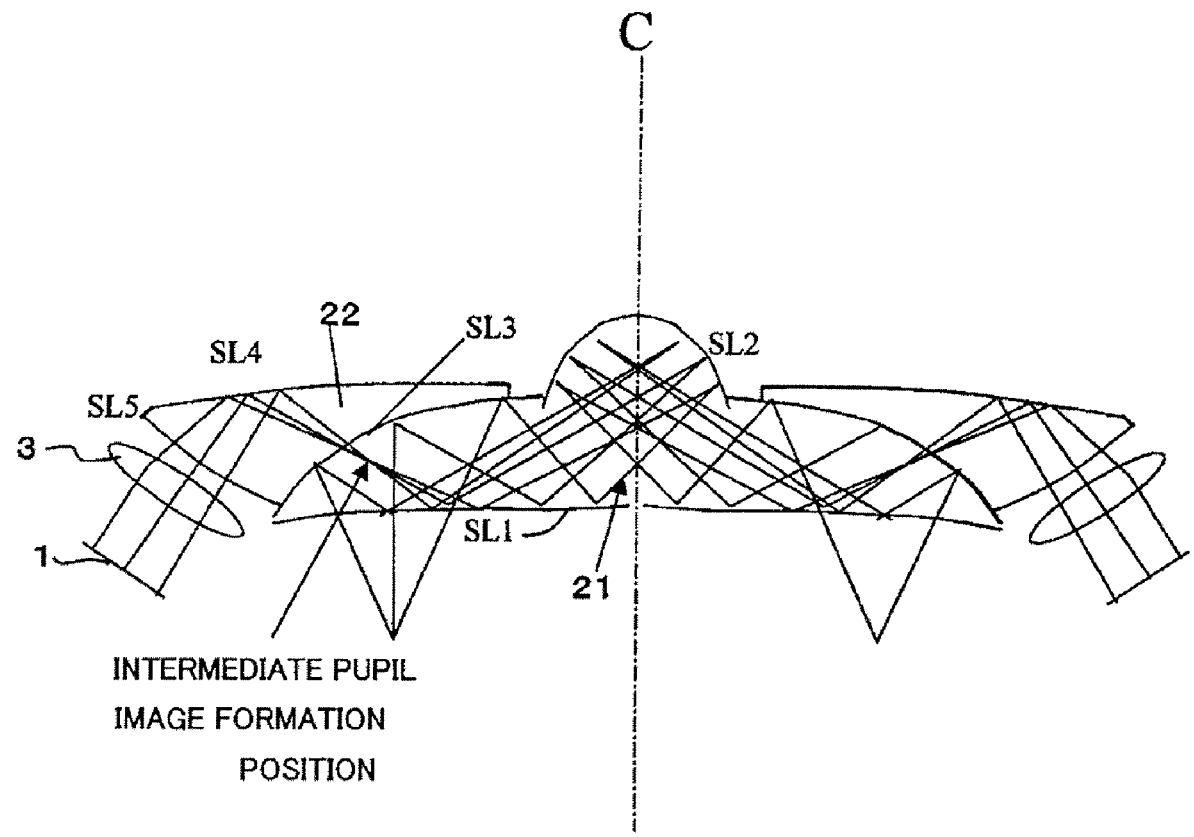
FIG. 5 is a top cross sectional view showing the optical paths of the principal rays in Embodiment 2.

As shown in FIG. 5, plural principal rays that exited from plural points on the LCD 1 form the exit pupil of the left-eye optical system centering on the position (exit pupil center) SCL. Thereby, an enlarged image of an original image displayed on the LCD 1 is provided to the left eye EL of the observer which is placed in a left observation region including the position of the exit pupil and the vicinity thereof.

In FIG. 4, the x-, y- and z-axes are defined similarly to those in Embodiment 1 shown in FIG. 2.

The optical path in the z-axis direction will be described first. The light beam that exited from the LCD 1 and proceeded in the z-positive direction is transmitted through the surface SL5 and then reflected by the surface SL4 to proceed in the z-negative direction.

The light beam that proceeded in the z-negative direction is transmitted through the surface SL3 to proceed in the z-negative direction, reflected by the surface SL1 to proceed in the z-positive direction and then reaches the surface SL2. The light beam is reflected by the SL2 such that its proceeding direction is changed to the z-negative direction and then reaches the surface SL1 again.

The light beam is reflected by the surface SL1 to proceed in the z-positive direction again, reflected by the surface SL3 to proceed in the z-negative direction and then reaches the left eye EL. Folding the optical path in a zig-zag manner like this makes it possible to reduce the thickness of the optical system.

Next, the optical path in the y-axis direction will be described. The light beam that exited from the LCD 1 located on the left-eye side with respect to the plane C, that is, on the y-positive side proceeds in the y-negative direction to reach the surface SL2 located on the right-eye side with respect to the plane C, that is, on the y-negative side via a reflection on the surface SL4, a transmission through the surface SL3 and a reflection on the surface SL1. During this proceeding, the proceeding direction that is the y-negative direction is maintained.

The light beam is reflected by the surface SL2 such that its proceeding direction is changed to the y-positive direction and then returned to the y-positive side with respected to the plane C. The light beam that returned to the y-positive side is reflected by the surface SL1 located on the y-positive side without a change of its proceeding direction that is the y-positive direction. Further, the light beam is reflected by the surface SL3 such that the y-component of the proceeding direction becomes substantially zero and then reaches the left eye EL placed on the y-positive side.

Also in this embodiment, the LCD 1 is located at a position further on the y-positive side than the exit pupil center (0, ysc, 0) of the left-eye optical system. That is, the distance from the plane C to the LCD 1 is longer than that from the plane C to the exit pupil center SCL. This makes it possible to form an extremely long optical path in the optical system. In addition, this makes it possible to reduce optical powers of the optical surfaces required for providing an enlarged virtual image of the original image displayed on the LCD 1 to the left eye EL, thereby facilitating an improvement of the optical performance of the optical system.

Moreover, the surface SL2, which has a role to cause the light beam proceeding in the y-negative direction to return such that the light beam proceeds in the y-positive direction, is located at a position which is on the y-negative side and folds the optical path in a zig-zag manner (in other words, the position which causes the light beam to alternately proceed to the z-positive and z-negative directions) Thereby, a small-sized optical system that is thin in the view axis direction (z-axis direction) is achieved.

Such a configuration of the optical system facilitates forming an intermediate real image of the original image displayed on the LCD 1 in the optical path of the optical system. Forming an intermediate real image makes it possible to arbitrarily determine the relationship between the optical power of each surface and the shape of the optical path, thereby increasing the freedom degree of arrangement of the optical surfaces. Accordingly, it becomes easy to widen the view angle for observation of the image with respect to the size of the original image, thereby making it possible to provide an impressive image with high realistic sensation to the observer in comparison with the size of the optical system.

This embodiment has the surface SL2 which reflects rays reflected by the surface SL1 toward the surface SL1 again. The central view angle principal ray that impinged again on the surface SL1 is reflected thereon and proceeds toward an opposite side to the previous reflection with respect to a normal on the hit point of the central view angle principal ray on the surface SL1. This makes it possible to shuttle the rays between the surfaces SL1 and SL2 to substantially overlap the optical paths therebetween. Consequently, a long optical path length can be ensured in the small-sized optical system. Therefore, display of images with a wide view angle can be realized with the small-sized LCD 1.

Figure 6:
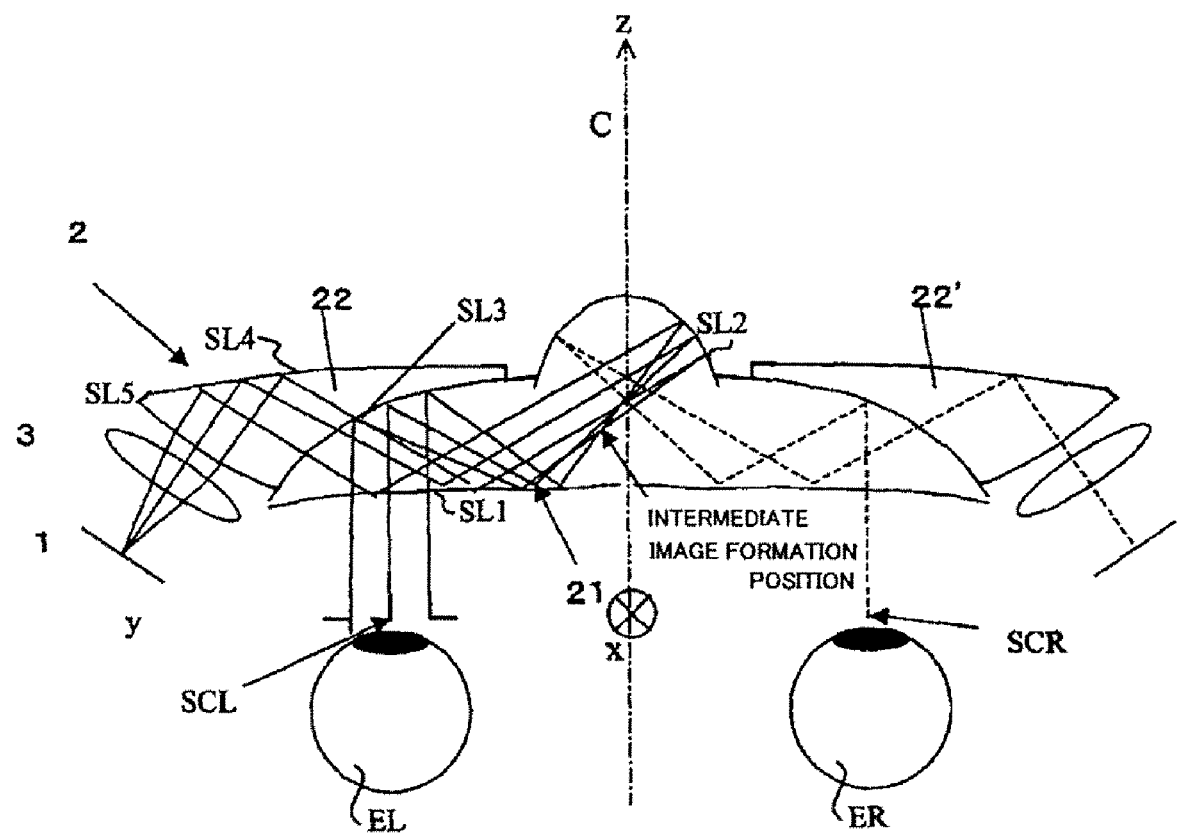
FIG. 6 is a top cross sectional view showing the intermediate image formation position in Embodiment 2.
Figure 7C:
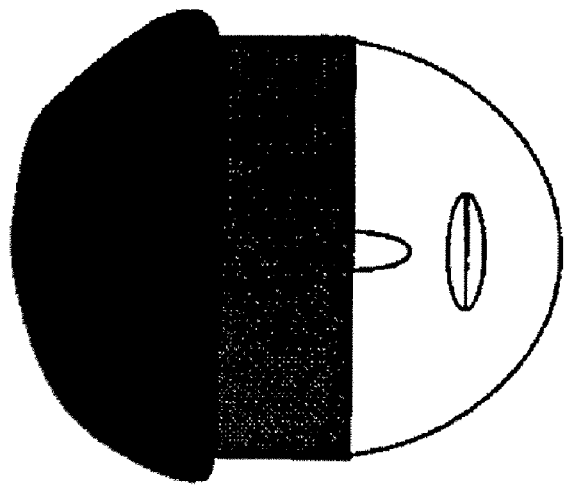
FIGS. 7A to 7C are figures for explaining an impression of an observer wearing an HMD when he/she is seen from the front.
Figure 7B:
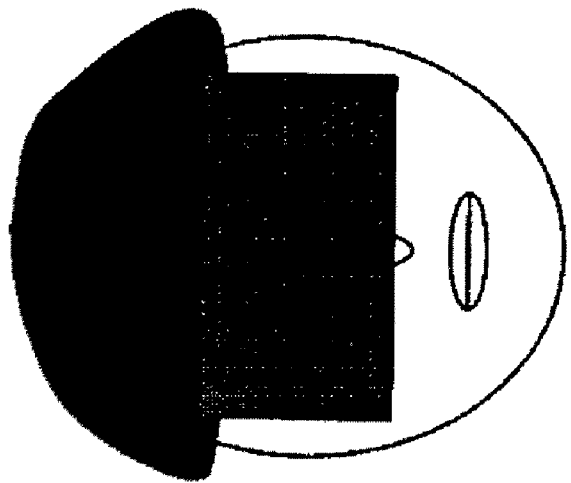
Figure 7A:
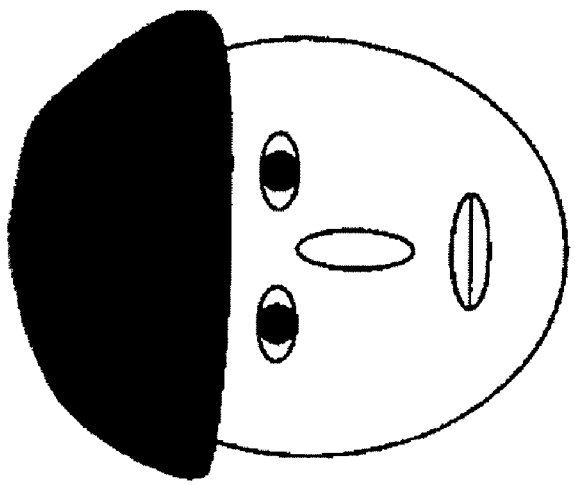

Next, the intermediate image in this embodiment will be described with reference to FIG. 6. As in Embodiment 1, the intersection of rays that exit from the center of the display surface (that is, the original image) and then reach the both ends of the effective exit pupil on the cross section shown in FIG. 6 is defined as an intermediate image formation position. In this embodiment, the intermediate image is formed in the optical path from the surface SL2 to the surface SL1 that is a decentered reflecting curved surface. This is because it becomes easy to reduce the effective size of the surface SL2.

However, this does not mean that the intermediate image formation position is limited to the position between the surfaces SL1 and SL2 in the present invention. Although it is preferable that an intermediate pupil image formation position is located in the optical path from the surface SL4 to the surface SL1, the intermediate pupil image formation position in the present invention is not limited thereto.

To reduce the size of the returning reflecting surface SL2, it is preferable that an intermediate pupil image formation is performed in the optical path anterior to the surface SL2 and an intermediate image formation is performed in the optical path posterior to the surface SL2 to balance a pupil light beam and an object light beam.

Next, the condition for the reflection on the surface SL2 will be described in detail. The surface SL2 performs a reflection such that the impinging ray and the reflected ray overlap with each other or form an acute angle. Satisfying this condition overlaps the optical path of the light beam proceeding to the surface SL3 and the optical path of the light beam reflected by the surface SL3 in the area surrounded by the plural reflecting surfaces to reduce the size of the optical system.

Focusing attention on the central view angle principal ray, it is preferable that the angle θ formed by the ray impinging on the surface SL2, which is a returning reflecting surface, and the ray reflected by the surface SL2 be smaller than 40 degrees.

In this case, in the prism 21, the central view angle principal ray in the optical path extending to the position where an intermediate image is formed in the relay optical system intersects with the central view angle principal ray in the optical path extending from the intermediate image to the pupil.

Overlapping the optical paths anterior and posterior to the surface SL2 as described above makes it possible to reduce the size of the optical system. It is more preferable that the angle θ formed by the ray impinging on the surface SL2 and the ray reflected by the surface SL2 be smaller than 20 degrees.

On the other hand, in a case where the ray impinging on the surface SL3 and the ray reflected by the surface SL3 overlap with each other, the optical path of the central view angle principal ray that entered the prism 21 from the surface SL3 and that proceeds to the surface SL2 via a reflection on the surface SL1 perfectly overlaps with the optical path of the central view angle principal ray that proceeds from the surface SL2 to the surface SL3 via a reflection on the surface SL1. In this case, the surface SL3 is not a surface decentering with respect to the central view angle principal ray. However, that is allowable in this embodiment.

In the optical system of this embodiment, since the decentering direction of the central view angle principal ray and each reflecting surface is only one direction, it is preferable to form each reflecting surface such that it has a plane-symmetric shape with respect to a plane (paper plane of FIGS. 4 to 6) including the central view angle principal ray. This makes it possible to use common components as the prisms 22 and 22'.

Furthermore, it is preferable to form each reflecting surface such that it has a rotationally asymmetric shape, which is symmetric only with respect to the yz cross section shown in FIG. 4. This is because a rotationally asymmetric aberration caused by the decentered reflecting curved surfaces SL1 to SL4 can be corrected and a high quality image thereby can be provided.

The prism 21 may be formed as a single-piece component having the surfaces SL1 to SL3 or may be formed as a component made by combination of plural blocks. In addition, in view of the symmetry of the left-eye and right-eye optical systems, the effective part of each of the surfaces SL2 and SR2 and the surfaces SL1 and SR1 may not have a rotationally symmetric shape or may have a rotationally symmetric aspheric shape with respect to the z-axis. Moreover, each of these surfaces may be a spherical surface. Using such a component having rotational symmetry reduces the cost of the optical system though the effect to correct the asymmetric aberration reduces. This is the same for the other surfaces.

However, in this embodiment, since the surface SL3 has a high degree of decentering and a high optical power, a large rotationally asymmetric aberration is generated by the surface SL3. Therefore, it is especially preferable to make the shape of the surface SL1 rotationally asymmetric to suppress generation of the rotationally asymmetric aberration. Increasing the number of the rotationally asymmetric surfaces facilitates an improvement of the optical performance.

Although a case where the prism 21 and the prisms 22 and 22' were combined with each other to form one integrated component was described in this embodiment, the present invention is not limited thereto. The prisms 21, 22 and 22' can be separated from each other. The separation thereof has an advantage for correcting aberrations because the number of the optical surfaces increases by one. On the other hand, the integration of the prisms 21, 22 and 22' reduces the number of assembling processes by, for example, eliminating a position adjustment of the prisms in the final assembling process.

Further, although the description was made of a case where two internal total reflections on the surface SL1 were made by the light beam impinging thereon at the incident angle equal to or more than the critical angle in this embodiment, the present invention is not limited thereto. A reflection and a transmission may be performed by using a half-mirror, for example. However, using the internal total reflections as described above reduces a loss of a light amount, thereby facilitating achievement of a bright optical system.

Moreover, although the lens 3 is formed as a single lens in this embodiment, it may be formed by a concave mirror, plural lenses, combination of a lens and a mirror, or the like. Forming the lens 3 by plural lenses reduces the optical power of each surface, which makes it possible to suppress aberrations generated by each surface and to improve the optical performance by, for example, obtaining an achromatic effect by the plural lenses including a concave lens.

Furthermore, the lens 3 can be eliminated by increasing the optical powers of the refracting surface SL5 and reflecting surface SL4 described in this embodiment.

Although the decentered reflecting surfaces include concave surfaces in this embodiment, it is preferable to employ a configuration which further includes at least one convex surface. The configuration of this embodiment includes the concave surfaces SL2, SL3 and SL4 and the convex surface SL1 to reduce the Petzval sum generated by the decentered reflecting surfaces and negates it by the lens 3. Thereby, it is possible to provide an image with little field curvature.

The above description with reference to FIGS. 4 to 6 is the same for the right-eye optical system.

As described above, according to each of the embodiments, the light beam from the image display element located on the right side with respect to the plane of symmetry (that is, located in the right-eye-side area) is reflected by the reflecting surface located on the right side, reflected by the reflecting surface located on the left side (that is, located in the left-eye-side area) and then introduced to the right observation region.

On the other hand, the light beam from the image display element located on the left side with respect to the plane of symmetry is reflected by the reflecting surface located on the left side, reflected by the reflecting surface located on the right side and then introduced to the left observation region.

Employing such an optical system makes it possible to realize a thin image display apparatus having a long optical path length which is needed for widening the view angle.

While preferred embodiments have been described, it is to be understood that modification and variation of the present invention may be made without departing from scope of the following claims.

This application claims foreign priority benefits based on Japanese Patent Application No. 2005-289873, filed on Oct. 3, 2005, which is hereby incorporated by reference herein in its entirety as if fully set forth herein.

What is claimed is:

1. An image display apparatus comprising:
first and second image display elements each of which displays an original image; and
an optical system which introduces light beams from the first and second image display elements to first and second observation regions, respectively,
wherein the optical system has a plane-symmetric structure whose plane of symmetry is a plane passing between the first and second observation regions, the first image display element and the first observation region being located in a first area on one side with respect to the plane of symmetry and the second image display element and the second observation region being located in a second area on the other side with respect to the plane of symmetry,
the optical system introduces the light beam from the first image display element to the first observation region via a reflection on a reflecting surface located in the second area after a reflection on a reflecting surface located in the first area, and
the optical system introduces the light beam from the second image display element to the second observation region via a reflection on a reflecting surface located in the first area after a reflection on a reflecting surface located in the second area.

2. The image display apparatus according to claim 1, wherein the optical system includes:
a pair of first reflecting surfaces which are located in the first and second areas and reflect the light beams from the first and second image display elements, respectively;
a pair of second reflecting surfaces which are located in the second and first areas and reflect the light beams from the first reflecting surfaces located in the first and second areas, respectively; and
a pair of third reflecting surfaces which are located in the first and second areas and reflect the light beams from the second reflecting surfaces located in the second and first areas to the first and second observation regions, respectively.

3. The image display apparatus according to claim 2, wherein the second reflecting surface reflects the light beam from the first reflecting surface to the first reflecting surface again, and
the light beam again reflected proceeds toward the third reflecting surface.

4. The image display apparatus according to claim 1, wherein the optical system includes a pair of fourth reflecting surfaces which are located in the second and first areas and reflect the light beams from the second reflecting surfaces located in the second and first areas to the third reflecting surfaces located in the first and second areas, respectively.

5. The image display apparatus according to claim 1, wherein the first and second image display elements are located at positions symmetric with respect to the plane of symmetry.

6. The image display apparatus according to claim 1, wherein the distance from the plane of symmetry to each of the first and second image display elements is longer than the distance from the plane of symmetry to each of the first and second observation regions.

7. The image display apparatus according to claim 1, wherein the optical system has a plane-symmetric shape with respect to a plane orthogonal to the plane of symmetry.

8. The image display apparatus according to claim 1, wherein the optical system forms an intermediate real image in the optical system.

9. The image display apparatus according to claim 1, wherein the optical system includes plural reflecting surfaces, and
   at least two of the plural reflecting surfaces are decentered reflecting surfaces.

10. The image display apparatus according to claim 1, wherein the optical system includes plural reflecting surfaces, and
    the plural reflecting surfaces include at least one concave reflecting surface and one convex reflecting surface.

11. An image display system comprising:
    the image display apparatus according to claim 1; and
    an image information supply apparatus which supplies image information to the image display apparatus.

* * * * *